(12) United States Patent
Katsura et al.

(10) Patent No.: US 11,183,911 B2
(45) Date of Patent: Nov. 23, 2021

(54) ROTATING ELECTRIC MACHINE

(71) Applicant: EXEDY Corporation, Neyagawa (JP)

(72) Inventors: Hitoshi Katsura, Neyagawa (JP);
Taichi Kitamura, Neyagawa (JP);
Kenji Kitada, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 0 days.

(21) Appl. No.: 16/849,276

(22) Filed: Apr. 15, 2020

(65) Prior Publication Data

US 2020/0366175 A1    Nov. 19, 2020

(30) Foreign Application Priority Data

May 13, 2019   (JP) .............................. JP2019-090812
Jan. 22, 2020   (JP) .............................. JP2020-008574

(51) Int. Cl.
*H02K 21/04*   (2006.01)
*H02K 9/19*    (2006.01)
*H02K 5/20*    (2006.01)

(52) U.S. Cl.
CPC ............. *H02K 21/048* (2013.01); *H02K 5/20* (2013.01); *H02K 9/19* (2013.01)

(58) Field of Classification Search
CPC ............................ H01H 1/243; H01H 21/048
See application file for complete search history.

(56) References Cited

U.S. PATENT DOCUMENTS 8,593,029 B2 * 11/2013 Inoue .................. H02K 21/048
310/156.66
2012/0293039 A1   11/2012 Hayashi et al.

FOREIGN PATENT DOCUMENTS

DE   102008002463 A1 * 12/2009 ............. H02K 1/243
JP   2012-244806 A    12/2012

* cited by examiner

*Primary Examiner* — Ramon M Barrera
(74) *Attorney, Agent, or Firm* — United IP Counselors, LLC

(57) ABSTRACT

A rotating electric machine includes a non-rotating member, a stator fixed to the non-rotating member, a field coil fixed to the non-rotating member, disposed on an inner diameter side of the stator, and having an iron core and a winding wound around the iron core, and a rotor rotatably disposed between the stator and the field coil. The rotor includes a first rotor portion and a second rotor portion. The rotating electric machine further comprises a positioning member disposed in each of the first gap, the second gap, and the third gap to position each of the first rotor portion and the second rotor portion in the circumferential direction and the extending direction.

1 Claim, 20 Drawing Sheets

ROTATING ELECTRIC MACHINE

CROSS-REFERENCE TO RELATED APPLICATION

This application claims the benefit of Japanese Patent Application No. 2019-090812, filed May 13, 2019 and Japanese Patent Application No. 2020-008574, filed Jan. 22, 2020.

BACKGROUND OF THE INVENTION

Field of the Invention

The present invention relates to a rotating electric machine.

Description of the Related Art

Conventionally, a rotating electric machine including a shaft, a rotor provided with a magnetic pole that rotates integrally with the shaft, a stator oppositely disposed on the outside of the rotor, a bracket rotatably supporting the shaft and accommodating the rotor and the stator, a yoke part fixed to the bracket, having an inner peripheral surface that faces the rotor via a gap, and forming a magnetic circuit together with the rotor and the stator, a bobbin engaging with an outer peripheral surface of a thin portion having an outer diameter smaller than the other portions of the yoke part, a field coil wound around the bobbin to generate magnetic flux, and a holding member joined to the thin portion to hold the bobbin in an axial direction is publicly known (for example, see Patent Document 1).

PRIOR ART DOCUMENT

Patent Document

[Patent Document 1] Japanese Patent Application Laid-Open No. 2012-244806

SUMMARY OF THE INVENTION

Technical Problem

In the conventional rotating electric machine, the rotor includes a front magnetic pole core and a rear magnetic pole core that are connected to each other in a state of being in contact with each other. For this reason, no consideration is given to the positioning of each member in a rotor composed of two members arranged with a gap.

An object of the present invention is to provide a rotating electric machine capable of more accurately positioning a first rotor portion and a second rotor portion arranged with a gap.

The present invention is configured as follows as a unit for solving the above-mentioned problem. That is, according to one aspect of the present invention, a rotating electric machine comprising a non-rotating member, a stator fixed to the non-rotating member, a field coil fixed to the non-rotating member, disposed on an inner diameter side of the stator, and having an iron core and a winding wound around the iron core, and a rotor rotatably disposed between the stator and the field coil, wherein the rotor includes a first rotor portion and a second rotor portion respectively arranged along an extending direction of a rotary shaft of the rotor, the first rotor portion includes a first annular portion extending in a circumferential direction with respect to the rotary shaft of the rotor, and a first extending portion extending from the first annular portion in the extending direction, the second rotor portion includes a second annular portion extending in the circumferential direction and disposed with a first gap with respect to the first extending portion in the extending direction, and a second extending portion extending from the second annular portion in the extending direction, disposed with a second gap with respect to the first extending portion in the circumferential direction, and disposed with a third gap with respect to the first annular portion in the extending direction, and the rotating electric machine further comprises a positioning member disposed in each of the first gap, the second gap, and the third gap to position each of the first rotor portion and the second rotor portion in the circumferential direction and the extending direction.

The rotating electric machine of the above aspect includes a positioning member disposed in each of a first gap between the first extending portion and the second annular portion in the extending direction of the rotary shaft of the rotor, a second gap between the first extending portion and the second extending portion in the circumferential direction with respect to the rotary shaft of the rotor, and a third gap between the second extending portion and the first annular portion in the extending direction of the rotary shaft of the rotor. With such a configuration, the first rotor portion and the second rotor portion can be positioned more accurately.

DESCRIPTION OF EMBODIMENT

Hereinafter, embodiments according to the present invention will be described with reference to attached drawings. It should be noted that the following description is merely exemplary in nature and is not intended to limit the present invention, its application, or its use.

A rotating electric machine of an aspect of the present invention is applicable to HEVs (hybrid electric vehicles), EVs (electric vehicles), and other devices that include an electric motor as a component. In the present embodiment, a rotating electric machine for an electric vehicle (EV) will be described as an example.

Figure 1:
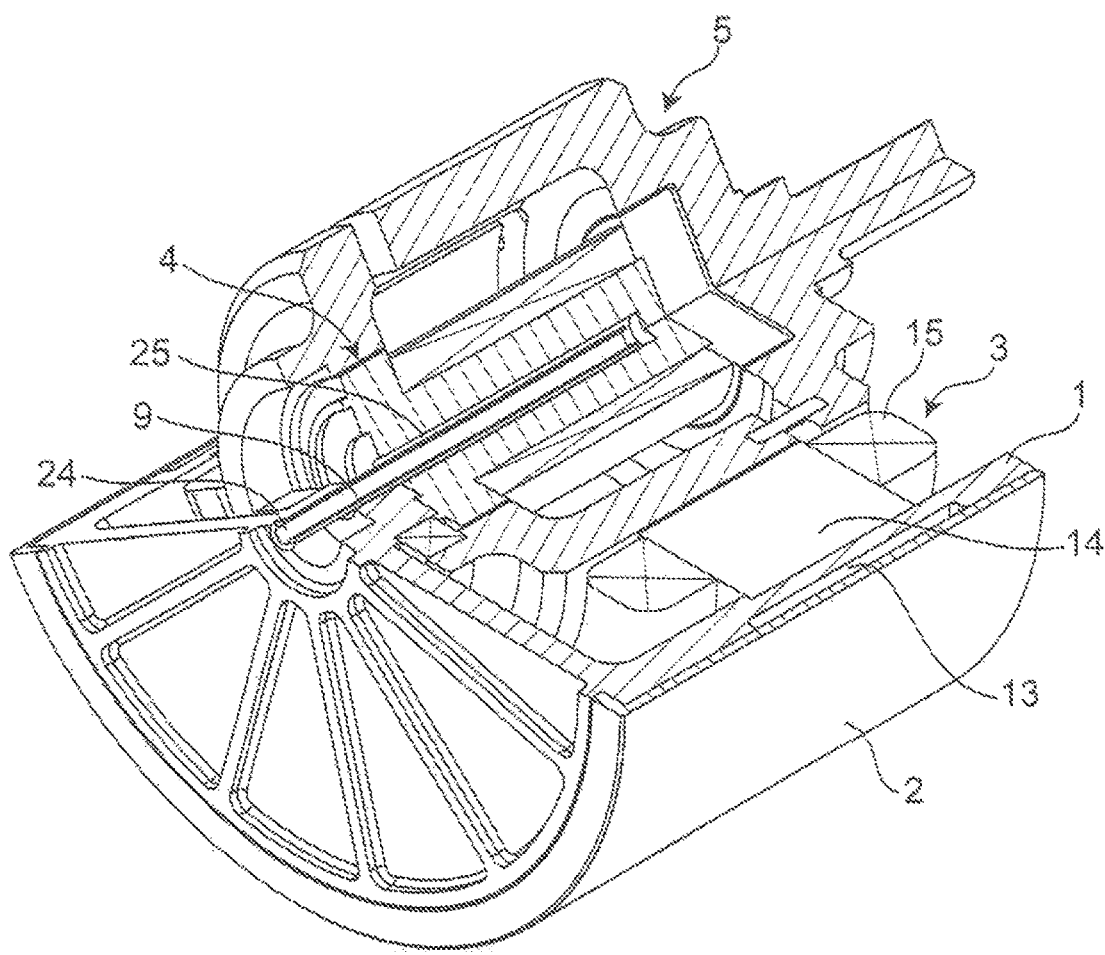
FIG. 1 is a partially cutaway perspective view of a rotating electric machine according to the present embodiment.

FIG. 1 is a partially cutaway perspective view of the rotating electric machine according to the present embodiment. The rotating electric machine includes a housing 1 that is an example of a non-rotating member, a jacket 2 that covers an outer peripheral surface of the housing 1, and a stator 3, a iron core 4 of a field coil and a rotor 5 that are provided in the housing 1. The rotating electric machine is configured that the rotor 5 rotates around the iron core 4 with respect to the housing 1, the stator 3 and the iron core 4.

Figure 2:
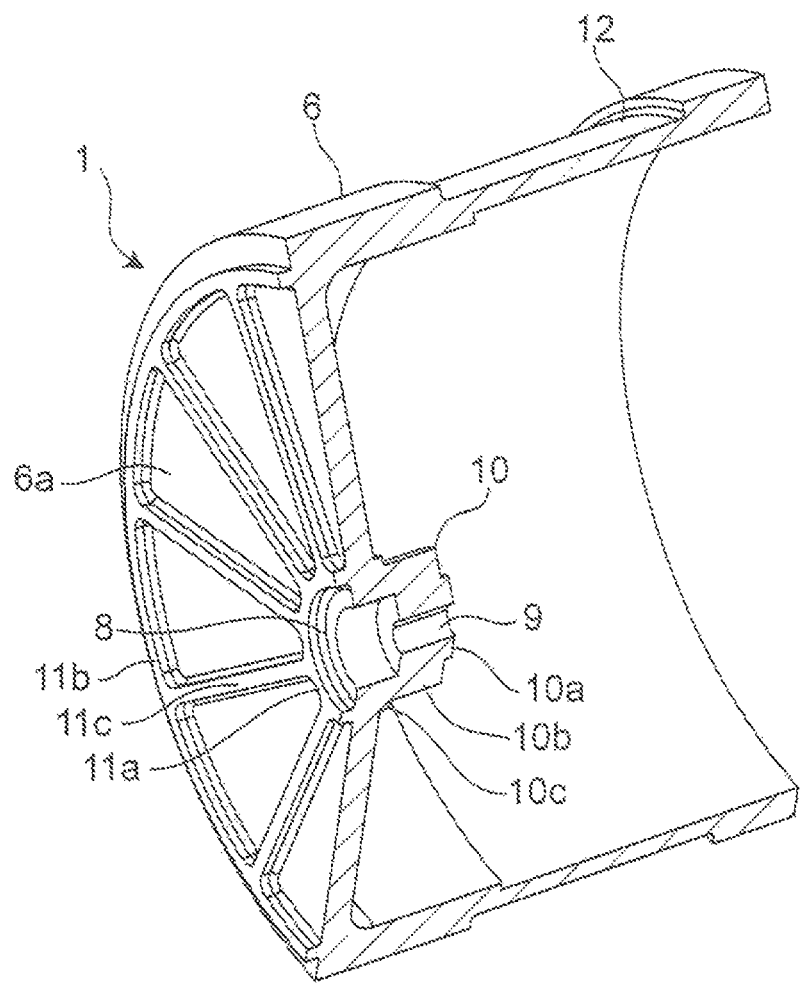
FIG. 2 is a partially cutaway perspective view showing a housing of FIG. 1.

As shown in FIG. 2, the housing 1 includes a bottomed cylindrical housing body 6 and a lid (not shown) that covers an opening on one end side of the housing body 6. A stepped recessed portion 8 is formed in a center of a wall portion 6a on the other end side of the housing body 6. A through hole 9 is formed at a center of the stepped recessed portion 8. On an inner surface side of the wall portion 6a, a guide portion 10 is formed by the stepped recessed portion 8. The guide portion 10 has a stepped shape and includes a first convex portion 10a, a second convex portion 10b, and a third convex portion 10c from a tip side thereof. On an outer end surface of the wall portion 6a, an inner diameter side annular rib 11a around the stepped recessed portion 8, an outer diameter side annular rib 11b of an outer periphery, and a plurality of linear ribs 11c extending radially and connecting the inner diameter side annular rib 11a and the outer diameter side annular rib 11b are formed. Further, an annular groove 12 is formed on an outer peripheral surface of the housing body 6 over the whole circumference.

The jacket 2 is formed in a cylindrical shape that covers the outer peripheral surface of the housing 1 as shown in FIG. 1. The jacket 2 covers the annular groove 12 of the housing 1 and defines a cooling water passage 13 for flowing cooling water as an example of a heat exchange medium. A plurality of communication holes (not shown) communicating with the cooling water passage 13 are formed in the jacket 2, and allows the cooling water to flow through the cooling water passage 13 via these communication holes.

The stator 3 includes a stator core 14 and a coil 15. The stator core 14 is obtained by laminating a plurality of electromagnetic steel plates. The stator core 14 is attached to the housing 1 such that a lamination direction of the electromagnetic steel plates coincides with an axial direction of the iron core 4. The coil 15 is wound around the stator core 14 to protrude from both ends in the axial direction.

Figure 3:
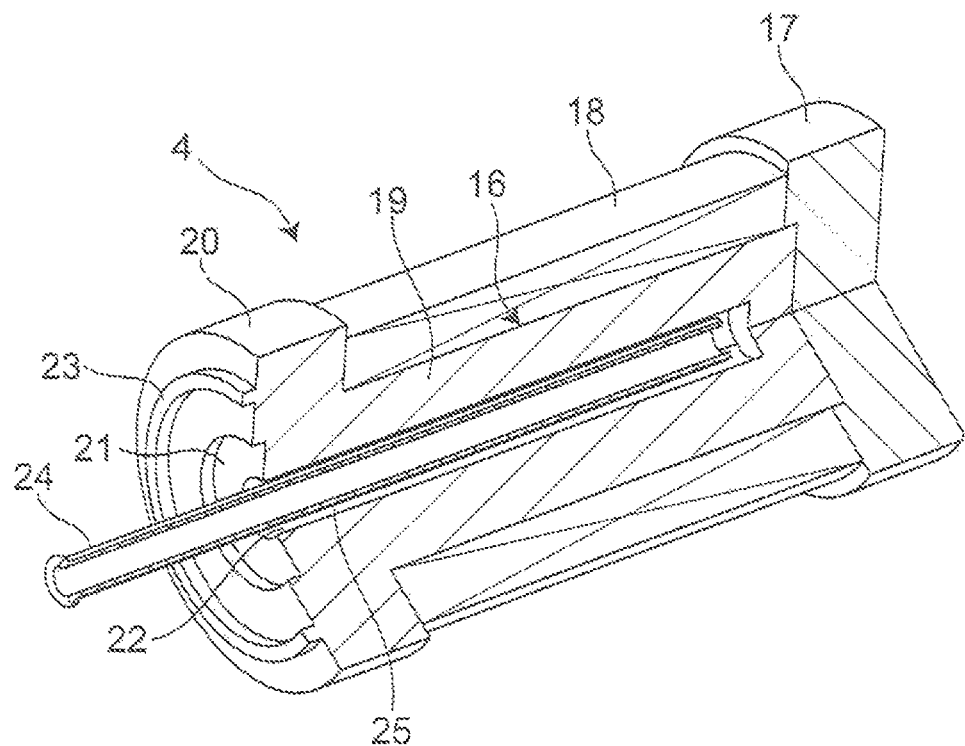
FIG. 3 is a partially cutaway perspective view showing an iron core of a field coil of FIG. 1.

The iron core 4 of the field coil includes a field coil core body 16, a field coil core flange portion 17, and a field coil 18, as shown in FIG. 3. The field coil core body 16 includes an iron core portion 19 and a flange portion 20. A circular positioning recessed portion 21 is formed at a center of the end face of the flange portion 20. A flow hole 22 is formed at a center of the positioning recessed portion 21. The flow hole 22 extends beyond the central position in a longitudinal direction of the iron core portion 19 and reaches near a tip of the iron core portion 19. An annular convex portion 23 is formed on an outer peripheral side of the end face of the flange portion 20. The field coil core flange portion 17 is fixed to the tip of the iron core portion 19. The field coil 18 is wound around a coil winding portion formed between the field coil 18 and the flange portion 20.

The field coil core flange portion 17 of the iron core 4 is fixed to the guide portion 10 of the housing 1. The first convex portion 10a of the guide portion 10 is fitted into the positioning recessed portion 21 of the field coil core flange portion 17, and the second convex portion 10b of the guide portion 10 is fitted into the annular convex portion 23. Thus, the iron core 4 is supported by the housing 1 in a so-called cantilever state. In this state, the through hole 9 of the housing 1 and the flow hole 22 of the iron core 4 communicate with each other. A pipe 24 having an outer diameter smaller than the flow hole 22 is inserted into the flow hole 22 through the through hole 9. Thereby, when cooling water is supplied into the flow hole 22 through a center hole of the pipe 24 (first flow path), the cooling water reaches a bottom of the flow hole 22 through the center hole of the pipe 24, flows through an annular passage 25 (second flow path) formed between the flow hole 22 and the pipe 24 to a through hole 9 side, and then is discharged to the outside of the flow hole 22. The annular convex portion 23 and the second convex portion 10b are fitted to form an annularly connected groove on the outer peripheral portion of the second convex portion 10b. A bearing 26 is disposed in this groove.

Figure 4:
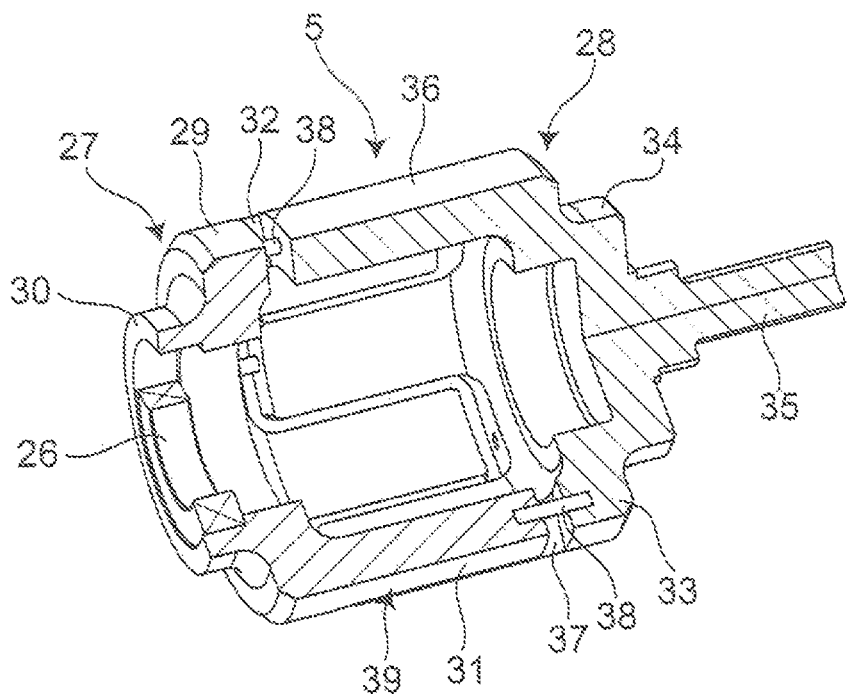
FIG. 4 is a partially cutaway perspective view showing a rotor of FIG. 1.

As shown in FIG. 4, the rotor 5 includes a first rotor portion 27 and a second rotor portion 28, and is rotatably supported on an outer peripheral side of the iron core 4 with respect to the stator 3 and the iron core 4.

The first rotor portion 27 includes a first annular portion 29 having a cylindrical portion 30 which has a smaller diameter than the first annular portion 29 and protrudes from the first annular portion 29. The guide portion 10 of the housing 1 rotatably supports the first annular portion 29 via a bearing 26. Further, a plurality of first extending portions 31 protrude from the first annular portion 29 to an opposite side of the cylindrical portion 30. The first extending portions 31 are formed at a predetermined pitch in a circumferential direction of the first annular portion 29, and a portion between two adjacent first extending portions 31 serves as a first relief portion 32. The first rotor portion 27 is made of a magnetic material, and becomes an S pole, for example, when current is supplied to the winding of the field coil 18.

The second rotor portion 28 includes a second annular portion 33. The second annular portion 33 is rotatably supported with respect to the stator 3 and the field coil 18. A pedestal portion 34 having a smaller diameter than the second annular portion 33 protrudes from the second annular portion 33. A rotary shaft 35 protrudes from a center of the pedestal portion 34. The rotational force of the rotary shaft 35 is transmitted to a driven part (not shown). Further, a plurality of second extending portions 36 protrude from the second annular portion 33 to an opposite side to the pedestal portion 34. The second extending portions 36 are formed at a predetermined pitch in a circumferential direction of the second annular portion 33, and a portion between two adjacent second extending portions 36 serves as a second relief portion 37. The second rotor portion 28 is made of a magnetic material, and becomes an N pole, for example, when current is supplied to the winding of the field coil 18.

The first rotor portion 27 and the second rotor portion 28 are connected to each other by positioning pins 38 which are electrically insulated in a state where the first extending portion 31 of the first rotor portion 27 and the second extending portion 36 of the second rotor portion 28 are positioned at the second relief portion 37 of the second rotor portion 28 and the first relief portion 32 of the first rotor portion 27, respectively. Thereby, the first rotor portion 27 and the second rotor portion 28 are prevented from displacing in a circumferential direction and an axial direction of the rotor 5. The first extending portion 31 and the second extending portion 36 form a cylindrical portion 39.

In the rotating electric machine having the above-described configuration, the driven part drives via the rotary shaft 35 by supplying current to the coil 15 from an inverter (not shown) and by electrically rotating the rotor 5. At this time, the coil 15 itself generates heat by supplying current to the coil 15. Therefore, cooling water is supplied to a cooling water passage 13 formed by the housing 1 and the jacket 2. The supplied cooling water flows through the cooling water passage 13 and absorbs internal heat from the outer peripheral surface of the housing 1. Further, cooling water is supplied to the flow hole 22 of the iron core 4 via the pipe 24. The supplied cooling water flows through the annular passage 25 formed between the flow hole 22 and the pipe 24 to absorb the heat of the field coil 18 via the iron core 4.

As described above, according to the rotating electric machine of the embodiment, the cooling water is supplied not only to the cooling water passage 13 between the housing 1 and the jacket 2 but also to an inside of the iron core 4, thereby enabling cooling also from the inside. Therefore, despite the configuration in which the iron core 4 having the field coil 18 is disposed on an inner diameter side of the rotor 5, the heat generated from the field coil 18 is effectively removed, and a good driving state can be secured.

Note that the present invention is not limited to the configuration described in the above embodiment, and various modifications are possible.

In the above embodiment, the cooling system is a water cooling system, but a cooling system using another heat exchange medium such as an oil cooling system may be used.

In the above embodiment, the cylindrical portion 39 of the rotor 5 is formed in a cylindrical shape having a substantially uniform thickness. However, a part of the cylindrical portion 39 may be thinned or thickened.

Figure 5:
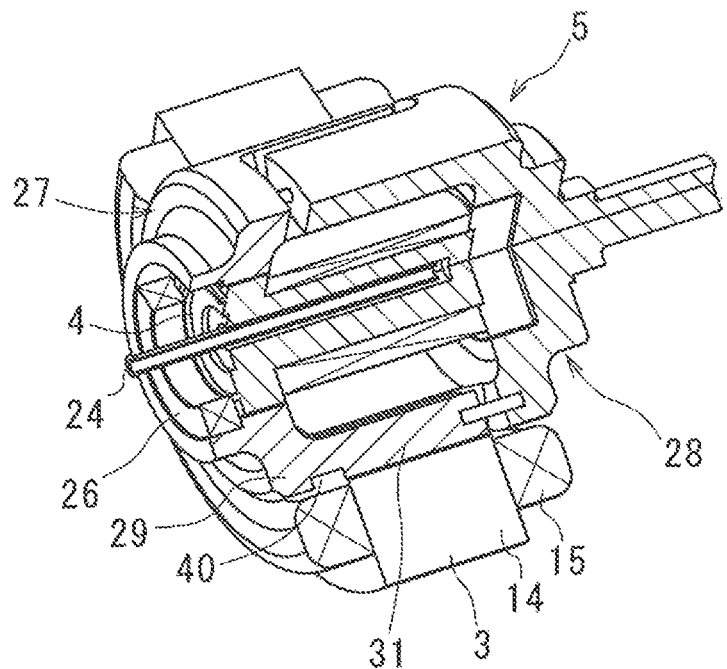
FIG. 5 is a partially cutaway perspective view of a rotating electric machine according to another embodiment.

In FIG. 5, recessed portions 40 connected in the circumferential direction are formed on the outer peripheral surface of the first rotor portion 27 and the outer peripheral surface of the second rotor portion 28, respectively (only the recessed portion 40 of the first annular portion 29 side is shown). Each recessed portion 40 faces both ends of the stator 3. As a result, the magnetic flux can be concentrated on the portion from a center of the stator 3 toward the rotor 5, and the rotating state of the rotor 5 can be stabilized.

Figure 6:
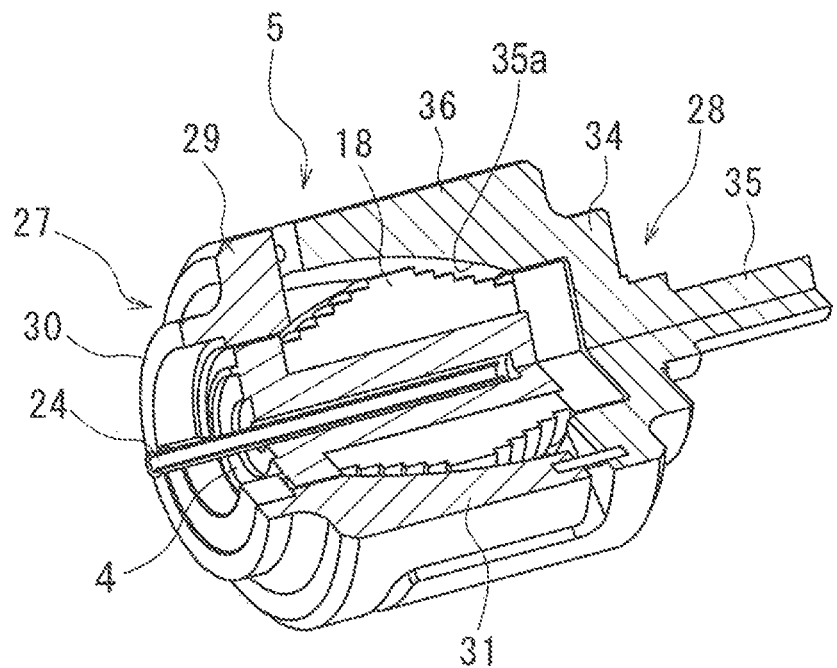
FIG. 6 is a partially cutaway perspective view of a rotating electric machine according to another embodiment.

In FIG. 6, the inner surfaces of the first extending portion 31 of the first rotor portion 27 and the second extending portion 36 of the second rotor portion 28 are configured by curved surfaces 35a that gradually change in thickness toward the outer diameter toward a tip of the rotor 5. That is, the thickness of the first extending portion 31 and the second extending portion 36 is thicker on the base portion side, and is gradually thinner toward the tip. Thereby, a substantially uniform magnetic flux distribution can be obtained in a portion of the second extending portion 36 facing the stator 3.

In this case, it is preferable that the shape of the field coil 18 wound around the iron core portion 19 of the iron core 4 be a stepped shape. In FIG. 6, the field coil 18 is wound into a plurality of step-like shapes to form a rugby ball as a whole, so as to conform to the inner surface shapes of the first extending portion 31 and the second extending portion 36. Thereby, an effective sectional area of the field coil 18 can be increased by effectively utilizing a space inside the rotor 5.

In the above-described embodiment, the first rotor portion 27 and the second rotor portion 28 are connected by the positioning pins 38. However, the following configuration may be adopted.

Figure 7:
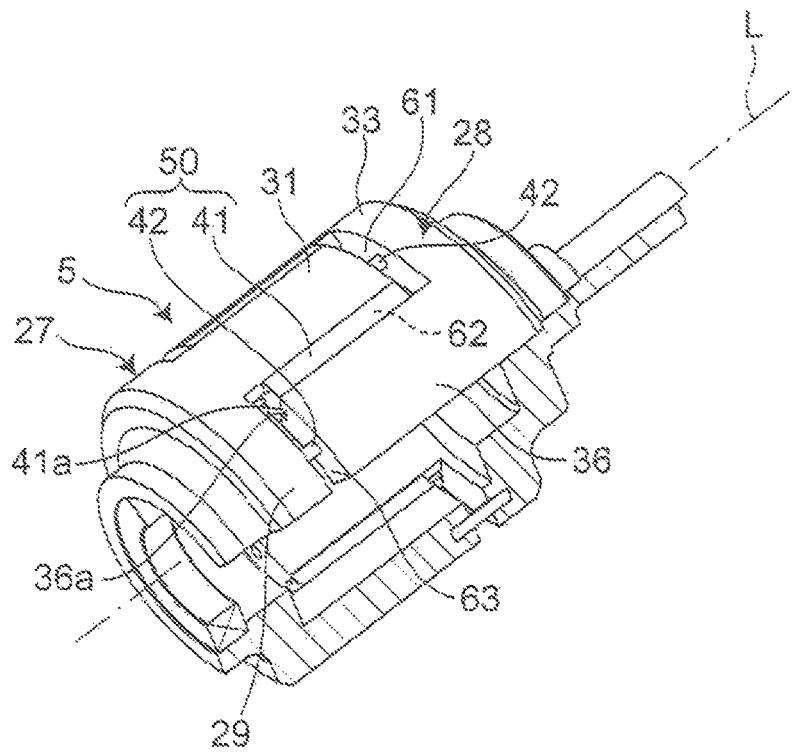
FIG. 7 is a partially cutaway perspective view of a rotor according to another embodiment.

As shown in FIG. 7, the rotor 5 has a first gap 61 between the first extending portion 31 of the first rotor portion 27 and the second annular portion 33 of the second rotor portion 28 in the extending direction of the rotary shaft thereof (that is, the extending direction of the straight line L shown in FIG. 7), a second gap 62 between the first extending portion 31 of the first rotor portion 27 and the second extending portion 36 of the second rotor portion 28 in the circumferential direction with respect to the rotary shaft of the rotor 5, and a third gap 63 between the first annular portion 29 of the first rotor portion 27 and the second extending portion 36 of the second rotor portion 28 in the extending direction of the iron core 4. A positioning member 50 made of a permanent magnet or a non-magnetic material is disposed in each of the gaps 61, 62, 63 between the first rotor portion 27 and the second rotor portion 28. As an example, the positioning member 50 has a substantially rectangular parallelepiped first positioning member 41 made of a non-magnetic material, and a substantially columnar second positioning member 42 made of a non-magnetic material. The first positioning member 41 is disposed in the second gap 62 and positions the first rotor portion 27 and the second rotor portion 28 in the circumferential direction. The second positioning member 42 is disposed in each of the first gap 61 and the third gap 63, and positions the first rotor portion 27 and the second rotor portion 28 in the axial direction (that is, in the extending direction of the iron core 4).

In each of the first extending portion 31 and the second extending portion 36, a groove 36a (the groove 36a of the first extending portion 31 side is not shown) extending from a tip toward a base side is formed at the center in the width direction (that is, in a radial direction with respect to the rotary shaft of the rotor 5). On both side surfaces in the circumferential direction of the first positioning member 41, ridges 41a provided at the center in the radial direction and extending in the longitudinal direction are formed, respectively. Each ridge 41a has a shape that can be fitted into the groove 36a. Such a configuration makes it possible to position the first rotor portion 27 and the second rotor portion 28 more accurately while increasing the rotational strength of the rotor 5. Note that, the groove 36a and the ridge 41a may have a rectangular cross section, but when the groove 36a and the ridge 41a have a T-shaped cross section and are configured to be slid from the end surface side and engaged with each other, it is preferable in that positioning in the radial direction can be performed more reliably.

Figure 8:
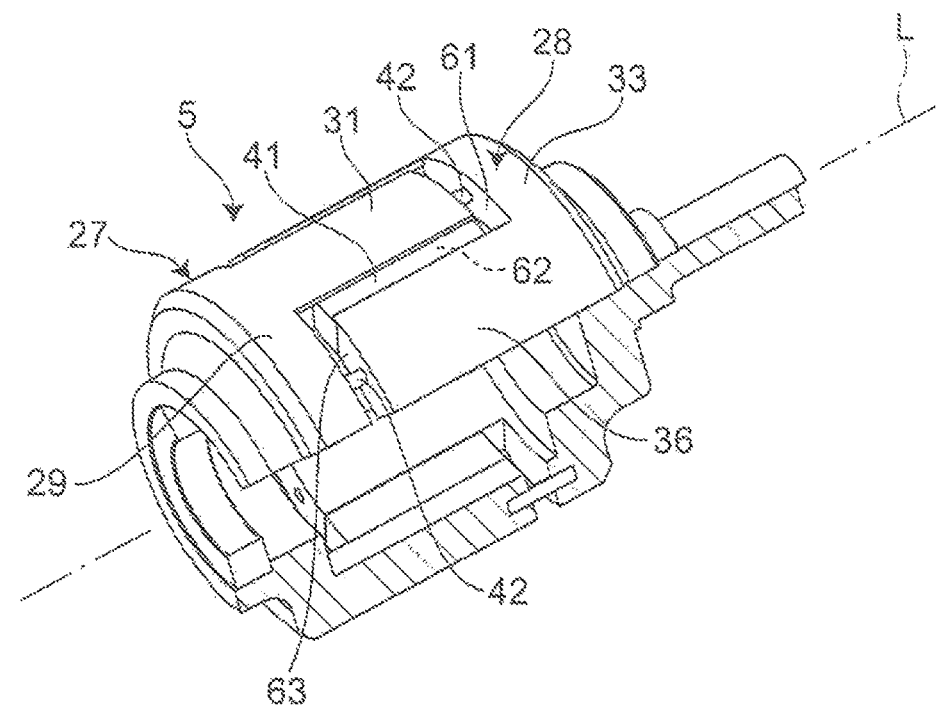
FIG. 8 is a partially cutaway perspective view of a rotor according to another embodiment.

In FIG. 8, a first positioning member 41 made of a permanent magnet is disposed between the first rotor portion 27 and the second rotor portion 28. Further, by forming the first positioning member 41 with a permanent magnet, the torque transmission performance of the rotor 5 can be improved.

Figure 9:
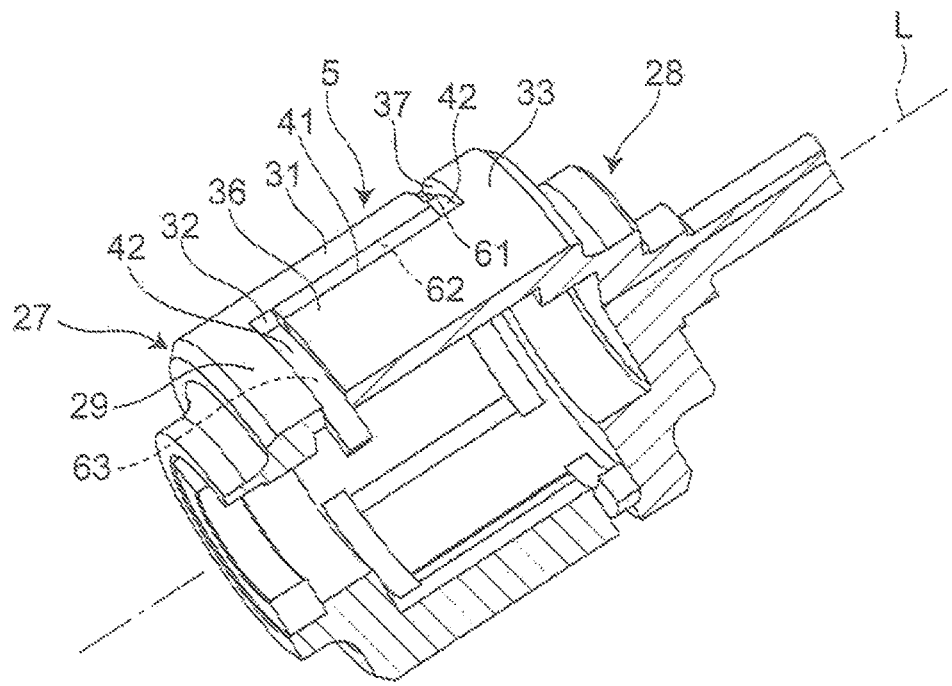
FIG. 9 is a partially cutaway perspective view of a rotor according to another embodiment.

In FIG. 9, further, between tips of the first extending portion 31 and the second relief portion 37 (that is, the first gap 61), and between tips of the second extending portion 36 and the first relief portion 32 (that is, the third gap 63), the substantially rectangular parallelepiped second positioning member 42 made of a permanent magnet is disposed. Further, the second positioning member 42 can also be made of a non-magnetic material, like the first positioning member 41. In this case, on the mutually opposite surfaces of the first extending portion 31 of the first rotor portion 27 and the second annular portion 33 of the second rotor portion 28, and on the mutually opposite surfaces of the first annular portion 29 of the first rotor portion 27 and the second extending portion 36 of the second rotor portion 28, a groove extending in the circumferential direction is formed, while ridges are formed on both side surfaces in the axial direction of the second positioning member 42, and thus, both can be fitted. Accordingly, the first positioning member 41 positions the rotor 5 in the circumferential direction and the second positioning member 42 positions the rotor 5 in the axil direction.

Figure 10A:
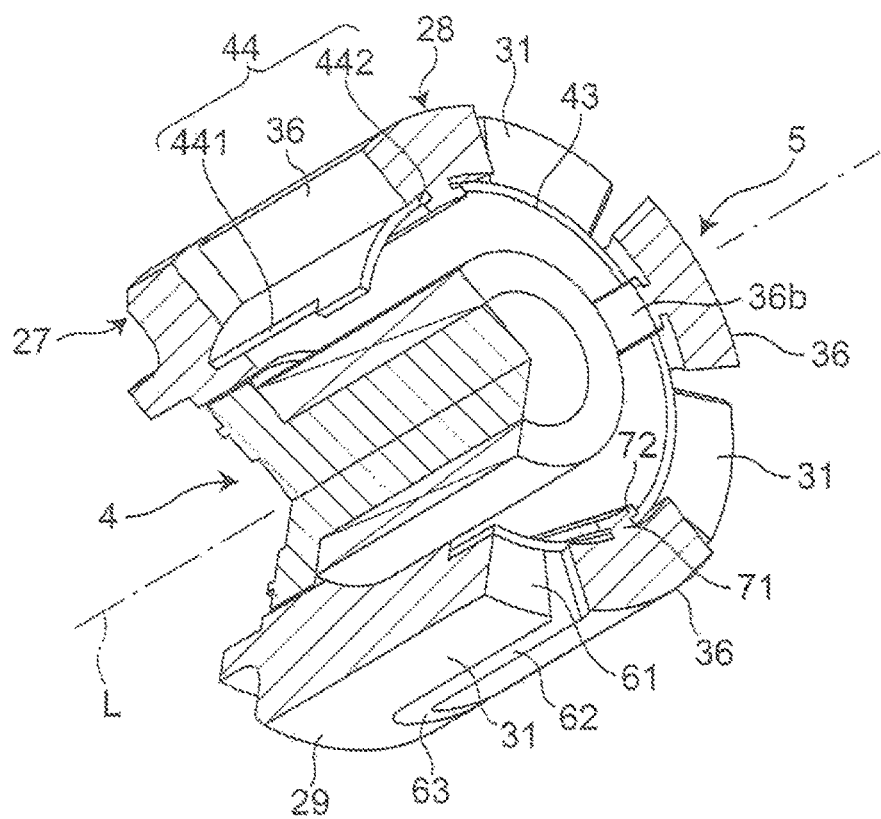
FIG. 10A is a partially cutaway perspective view of a rotor and an iron core of a field coil according to another embodiment.
Figure 10B:
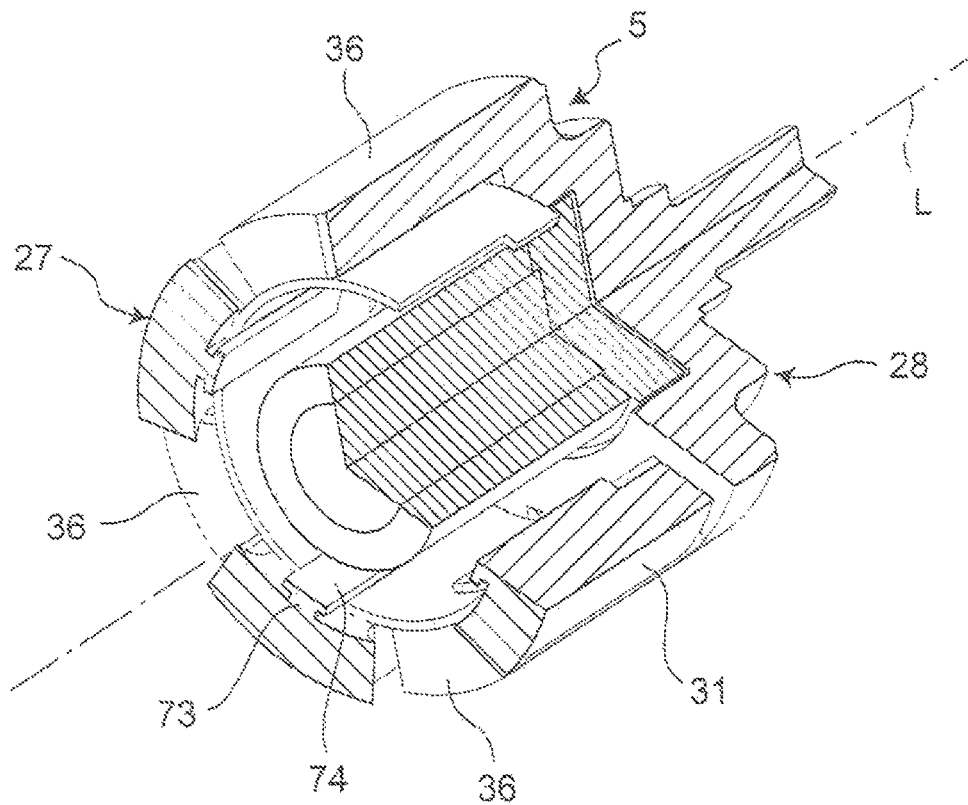
FIG. 10B is a partially cutaway perspective view of the rotor and the iron core of the field coil viewed from a direction different from that of FIG. 10A.

In FIGS. 10A and 10B, a reinforcing ring 43 as an example of a positioning ring is disposed on the inner diameter side of the rotor 5. The reinforcing ring 43 has a hollow cylindrical shape, and a plurality of groove portions 44 extending in the longitudinal direction from opening edges of both ends are formed. The plurality of groove portions 44 include a first groove portion 441 extending along an axial direction of the reinforcing ring 43 from a first end in the axial direction toward a second end in the axial direction, and a second groove portion 442 extending along the axial direction from the second end in the axial direction toward the first end in the axial direction. The first groove portion 441 is formed at a position corresponding to each first extending portion 31 of the first rotor portion 27, and the second groove portion 442 is formed at a position corresponding to each second extending portion 36 of the second rotor portion 28. Each of the first extending portion 31 and the second extending portion 36 is formed with a ridge 36b (the ridge 36b of the first extending portion 31 side is not shown) having a T-shaped cross section that engages with each groove portion 44. In other words, the first rotor portion 27 includes a first protruding portion 73 (shown in FIG. 10B) that protrudes from the first extending portion 31 in the radial direction with respect to the rotary shaft of the rotor 5, and a first locking portion 74 (shown in FIG. 10B) extending from a radial tip of the first protruding portion 73 in the circumferential direction with respect to the rotary shaft of the rotor 5. In addition, the second rotor portion 28 has a second protruding portion 71 (shown in FIG. 10A) protruding from the second extending portion 36 in the radial direction, and a second locking portion 72 (shown in FIG. 10A) extending from a radial tip of the second protruding portion 71 in the circumferential direction. The first protruding portion 73 is disposed in the first groove portion 441, and the second protruding portion 71 is disposed in the second groove portion 442. As an example, the locking portions 72 and 74 extend from the tips of the protruding portions 71 and 73 to both sides in the circumferential direction, and lock the first rotor portion 27 and the second rotor portion 28 in the radial direction, respectively. Such a configuration makes it possible to position the first rotor portion 27 and the second rotor portion 28 more accurately while increasing the rotational strength of the rotor 5. That is, according to the configuration of FIG. 10, it is possible to position the first rotor portion 27 and the second rotor portion 28 while improving the rotational strength of the rotor 5 without the first intermediate member 41 and the second intermediate member 42 as shown in FIG. 9. The reinforcing ring 43 is not limited to the inner diameter side of the rotor 5 (that is, a radially inner side of the first extending portion 31 and the second extending portion 36), but may be disposed on the outer diameter side of the rotor 5 (that is, a radially outer side of the first extending portion 31 and the second extending portion 36).

In the above embodiment, a flow path constituted by the pipe 24 and the annular passage 25 is provided, but this flow path can be omitted. That is, the present invention can be applied also to a rotating electric machine having no flow path.

In the above-described embodiment, the flow hole 22 is formed at the center of the iron core portion 19 of the iron core 4. However, the flow hole 22 may be configured as follows.

Figure 11:
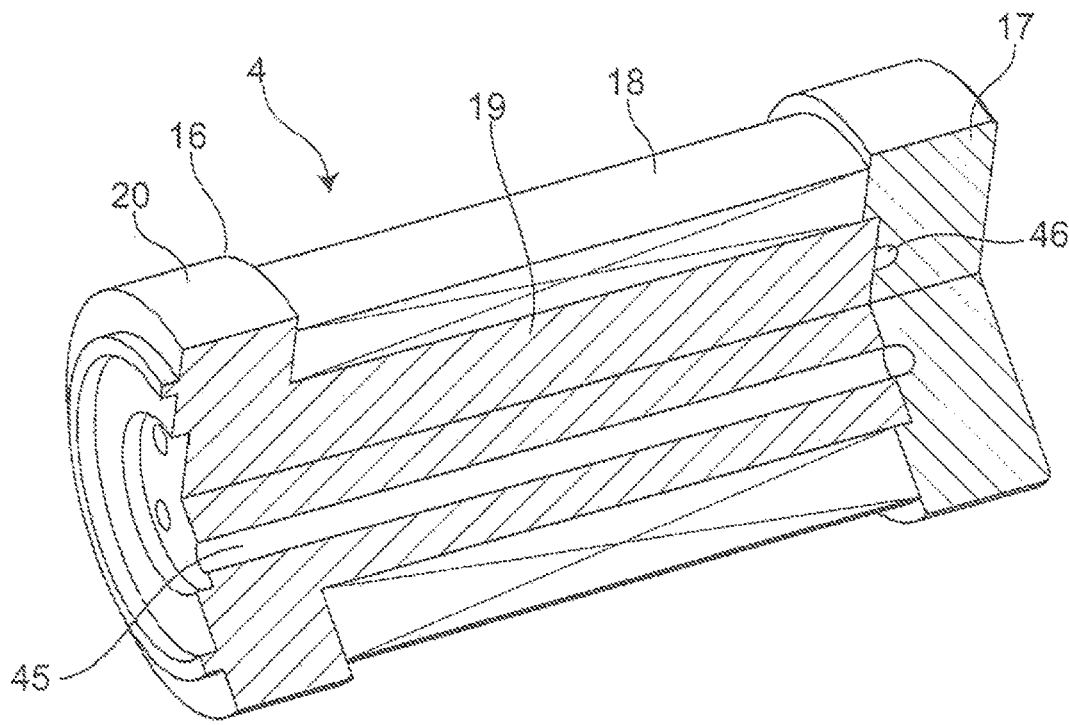
FIG. 11 is a partially cutaway perspective view of an iron core of a field coil according to another embodiment.

In FIG. 11, a plurality of flow holes 45 are formed on the same circumference on the outer peripheral side of the iron core portion 19. Each flow hole 45 penetrates the iron core portion 19 in the extending direction and is opened at both ends of the iron core portion 19. An annular groove 46 is formed in the field coil core flange portion 17 so that the plurality of flow holes 45 communicate with each other. With this configuration, the heat exchange medium that has flowed in from one of the flow holes 45 from one end side of the iron core portion 19 flows to the other end side, and then flows through the annular groove 46 to the one end side through any of the remaining flow holes 45. According to this, cooling can be performed on the outer peripheral side of the iron core portion 19, and the cooling effect can be further exhibited as compared with the case where the flow hole is provided at the central portion.

The positioning member 50 can also be configured as follows. In FIGS. 12 to 26, regarding the two rotor portions 27 and 28 of the rotor 5, the rotor portion farther from the wall portion 6a in the extending direction is defined as the first rotor portion 27, and the rotor portion closer to the wall portion 6a in the extending direction is defined as the second rotor portion 28.

Figure 12:
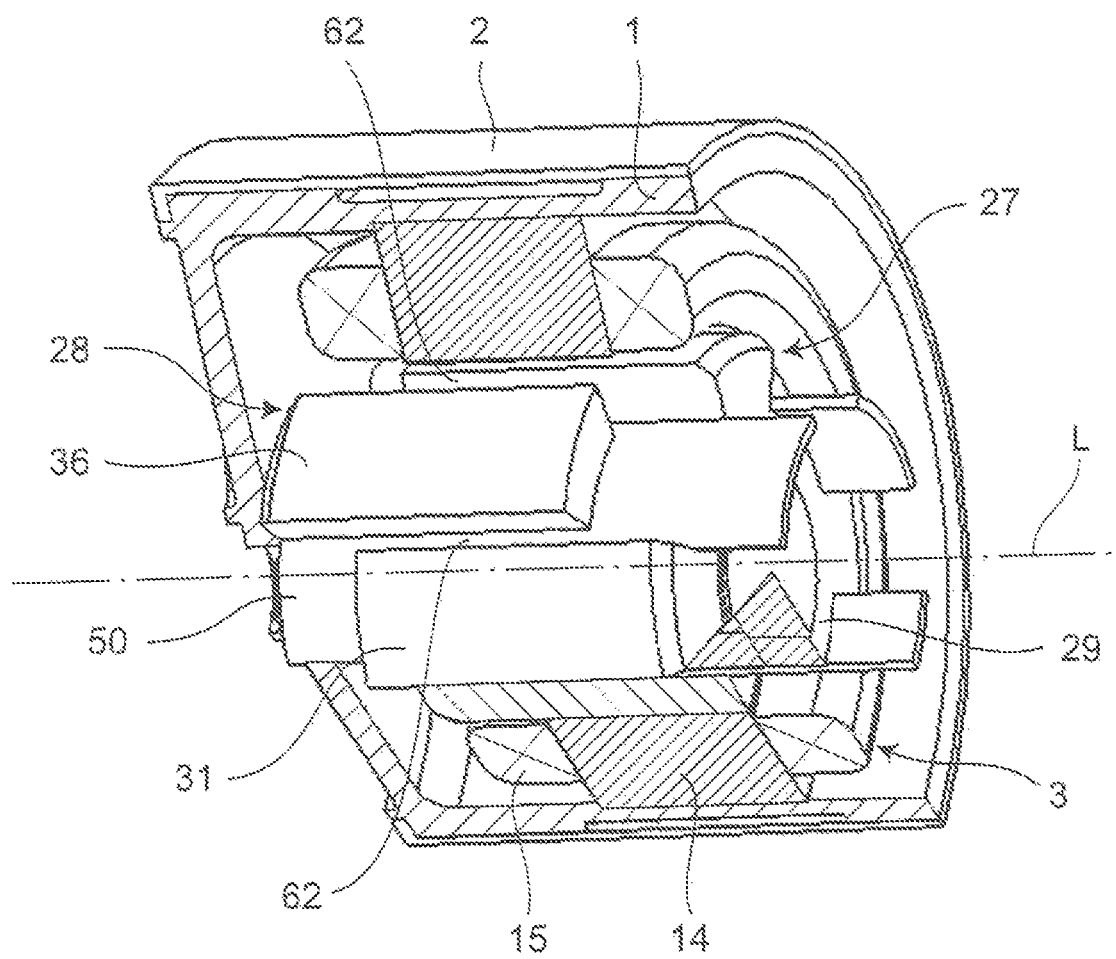
FIG. 12 is a partially cutaway perspective view of a rotating electric machine according to another embodiment.

For example, the positioning member 50 of the rotating electric machine shown in FIGS. 12 to 15 is made of a non-magnetic material such as aluminum, stainless steel, or resin, and includes a main body 51 and a connection shaft portion 52 provided at a one end in the extending direction of the rotary shaft of the rotor 5 in the main body 51 (in other words, the extending direction of the straight line L in FIG. 12, hereinafter, it is simply referred to as the extending direction.)

Figure 14:
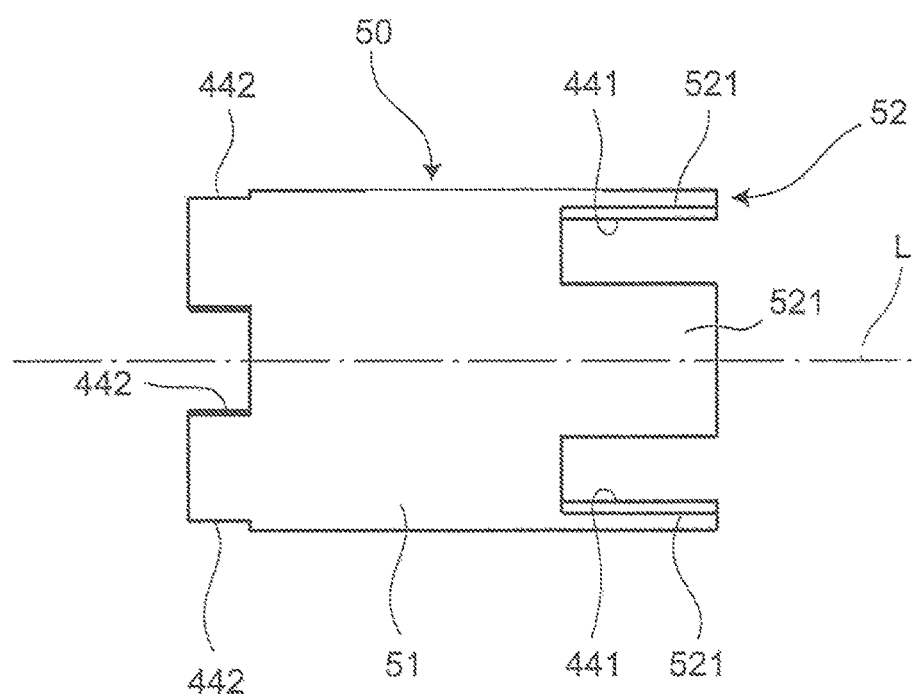
FIG. 14 is a side view of a positioning member according to another embodiment.

As shown in FIG. 14, the main body 51, for example, having a substantially cylindrical shape includes a first groove portion 441 provided at one end in the extending direction and a second groove portion 442 provided at the other end in the extending direction. Each of the first groove portion 441 and the second groove portion 442 has a substantially square shape, and penetrates the main body 51 in a thickness direction thereof. In the first groove portion 441, a connecting portion 53 (see FIG. 15) of the first rotor portion 27 described later is disposed, and in the second groove portion 442, a connecting portion of the second rotor portion 28 described later is disposed. The first groove portion 441 and the second groove portion 442 are arranged at different positions in a circumferential direction (hereinafter, simply referred to as a circumferential direction) with respect to the rotary shaft of the rotor 5. Specifically, the second groove portion 442 is located between the circumferentially adjacent first groove portions 441, and the first groove portion 441 is located between the circumferentially adjacent second groove portions 442. The main body 51 may have, for example, a segment structure including a first portion provided with the first groove portion 441 and a second portion provided with the second groove portion 442. Further, each of the first groove portion 441 and the second groove portion 442 is not limited to a substantially square shape, and may be, for example, a substantially triangular shape.

Figure 13:
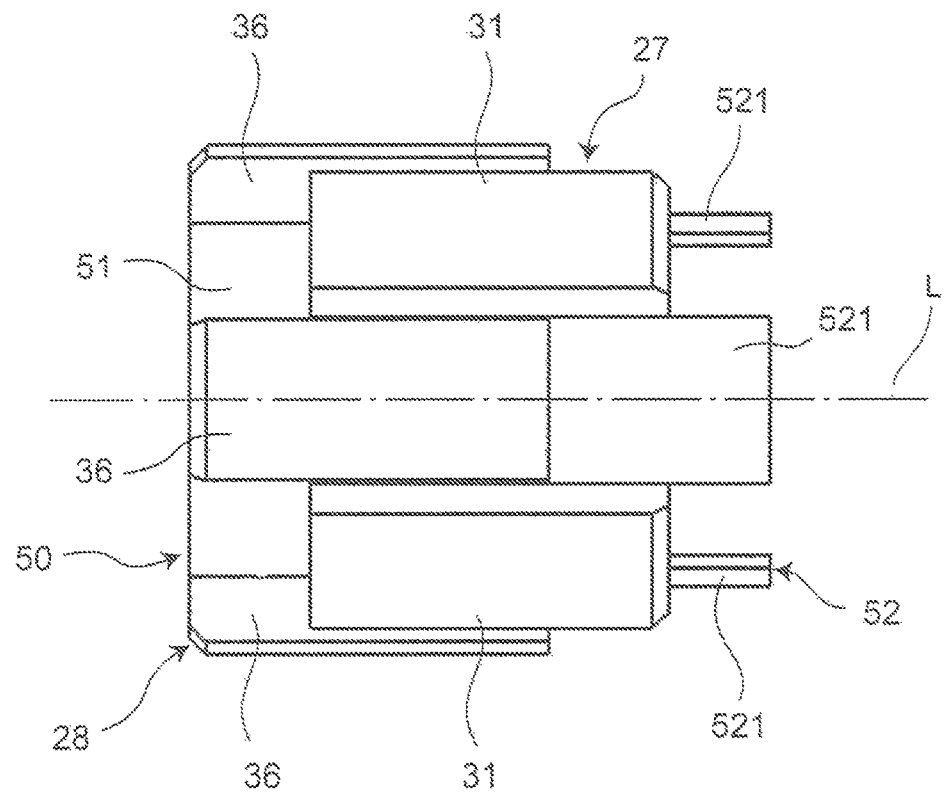
FIG. 13 is a side view of a rotor according to another embodiment.
Figure 16:
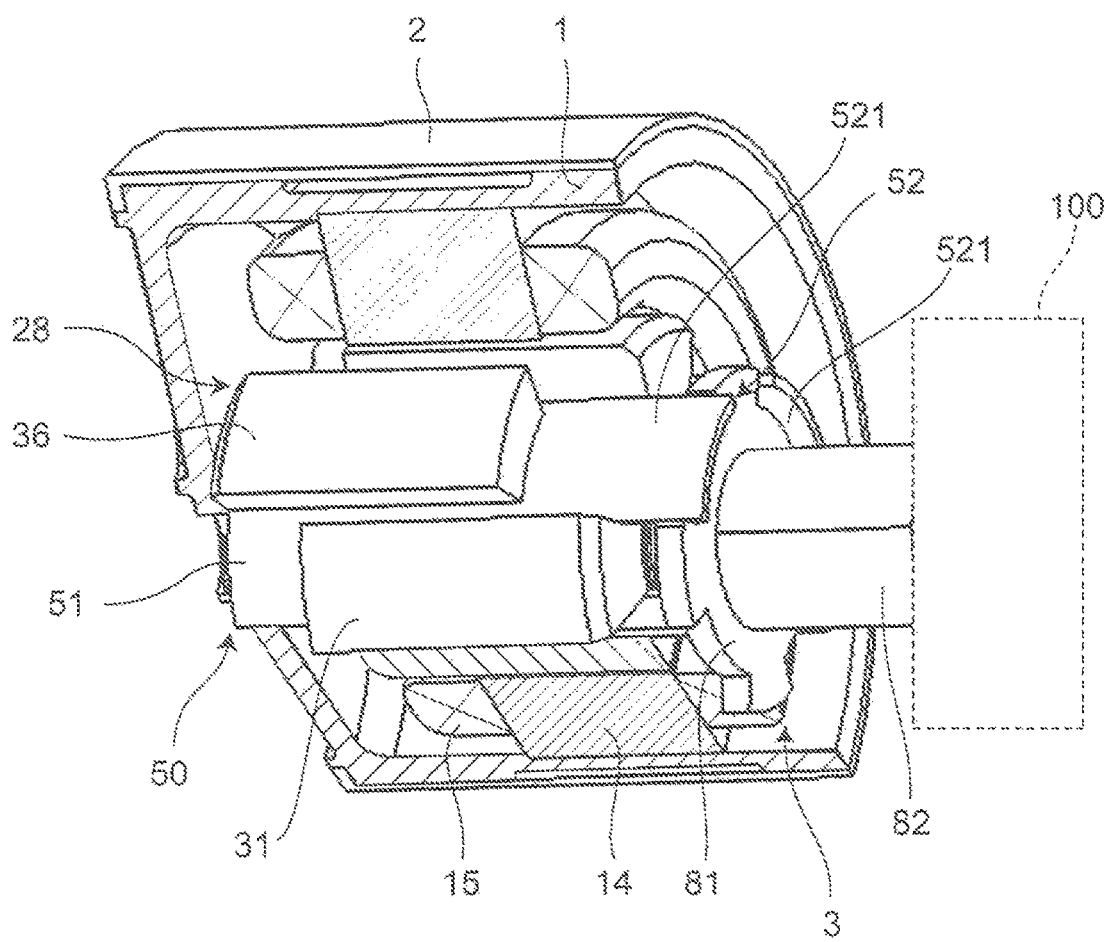
FIG. 16 is a partially cutaway perspective view of a rotating electric machine according to another embodiment.
Figure 17:
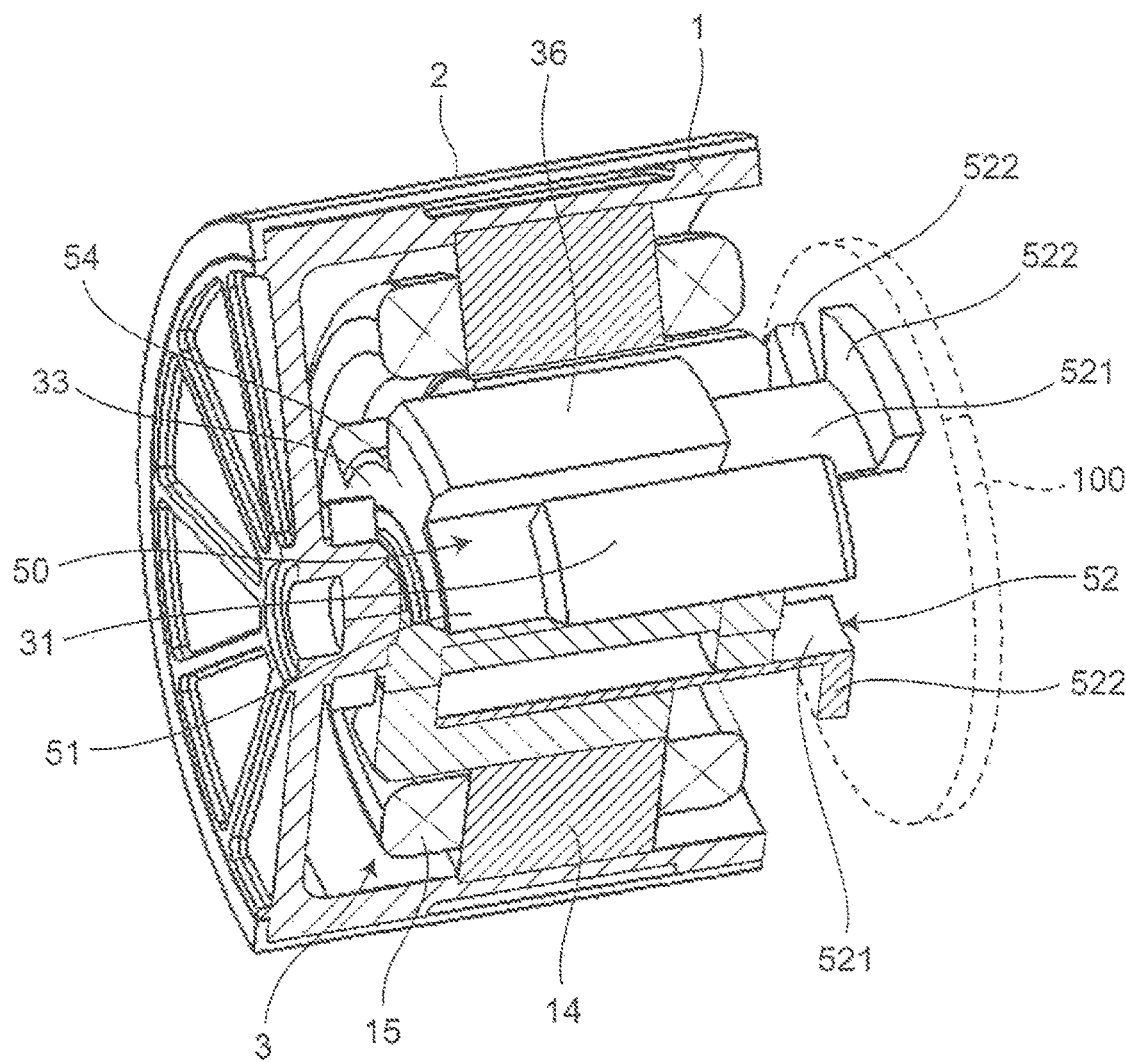
FIG. 17 is a partially cutaway perspective view of a rotating electric machine according to another embodiment.

As shown in FIG. 12, for example, the connection shaft portion 52 includes a plurality of plate members 521 curved along an outer periphery of the main body 51, and is formed integrally with the main body 51. Each of the plate members 521 is disposed between the circumferentially adjacent first groove portions 441, as shown in FIGS. 13 and 14, and extends in a direction separated from the main body 51 along the extending direction from one end of the main body 51. The connection shaft portion 52 is configured such that its tip (in other words, an end farther from the main body 51 in the extending direction of the connection shaft portion 52) is connectable to a rotating member, such as an outer shell of a torque converter, a manual clutch and an outer shell of a flywheel. For example, as shown in FIG. 16, a substantially disk-shaped bedsill 81 is fixed to the tip of each plate member 521, and the connection shaft portion 52 can be connected to the rotating member 100 indirectly via a substantially columnar shaft member 82 extending in the extending direction from the bedsill 81. In this case, for example, the positioning member 50 is directly connected to the clutch element, and the number of components of the rotating electric machine is reduced. Also, for example, as shown in FIG. 17, the tip of each plate member 521 is bent outward in the radial direction to form a flange portion 522, and via this flange portion 522, the connection shaft portion 52 can be directly connected to the rotating member 100. In this case, the rotor 5 is positioned in the axial direction, and there is no need to support the rotor 5 with another component such as a bearing. The connection shaft portion 52 and the bedsill 81 or the rotating member 100 are fixed and connected by, for example, bolting, riveting or welding.

Figure 15:
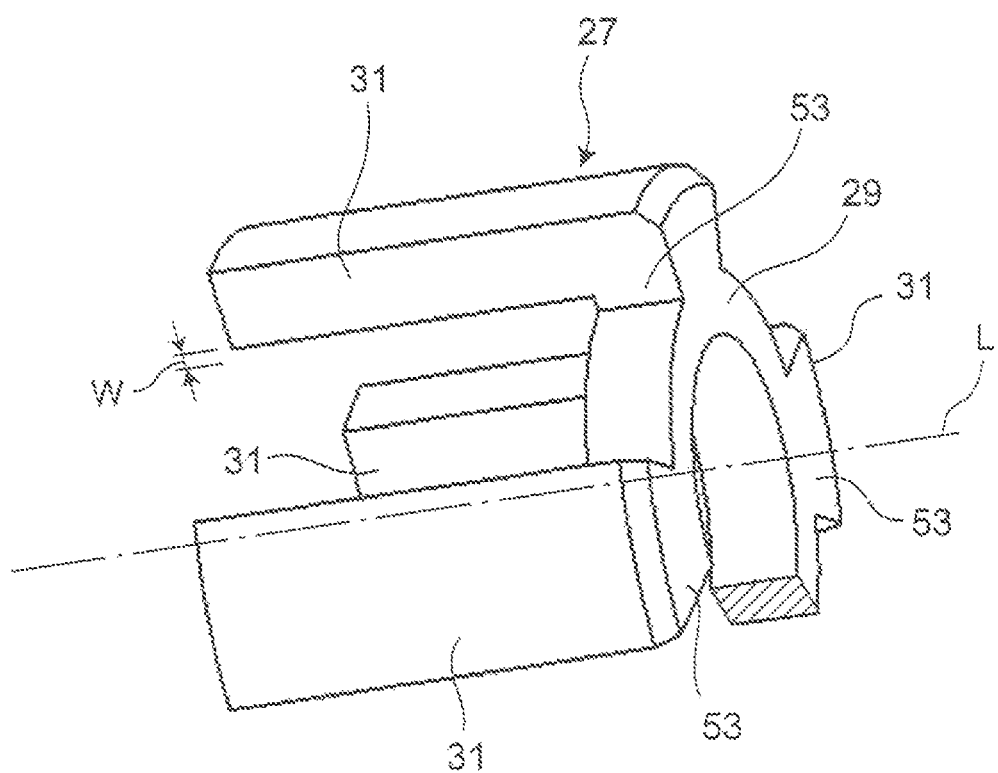
FIG. 15 is a perspective view of a first rotor portion according to another embodiment.

In the rotating electric machines shown in FIGS. 12 to 15, the first rotor portion 27 and the second rotor portion 28 have the same shape and configuration. As shown in FIG. 15, the first rotor portion 27 has the first annular portion 29, a plurality of first connecting portions 53, and a plurality of first extending portions 31. The first annular portion 29 has a ring shape and extends in the circumferential direction. Each of the first connecting portions 53 extends from an outer peripheral surface of the first annular portion 29 radially outward with respect to the rotary shaft of the rotor 5. Each of the first extending portions 31 has a substantially rectangular parallelepiped shape extending from the first connecting portion 53 in the extending direction, and is disposed at an interval W in the radial direction with respect to the outer peripheral surface of the first annular portion 29. The first annular portion 29 and the first extending portion 31 are connected via the first connecting portion 53. The second rotor portion 28 has a second annular portion 33 (see FIG. 17), a plurality of second connecting portions 54 (see FIG. 17), and a plurality of second extending portions 36 (see FIG. 17). As described above, the second annular portion 33 has the same shape and configuration as the first annular portion 29, the second connecting portion 54 has the same shape and configuration as the first connecting portion 53, and the second extending portion 36 has the same shape and configuration as the first extending portion 31. The second extending portion 36 is disposed with a second gap 62 with respect to the first extending portion 31 in the circumferential direction. The tip of the first extending portion 31 in the extending direction (in other words, the end farther from the first annular portion 29 in the extending direction of the first extending portion 31) and the tip of the second extending portion 36 in the extending direction (in other words, the end farthest from the second annular portion 33 in the extending direction of the second extending portion 36) are located between the first annular portion 29 and the second annular portion 33 in the extending direction. Each of the first extending portion 31 and the second extending portion 36 is disposed outside the positioning member 50 in the radial direction.

As described above, according to the rotating electric machine shown in FIGS. 12 to 15, since the positioning member 50 constitutes the input/output shaft of the rotating electric machine, it is possible to position the first rotor portion 27 and the second rotor portion 28 in the axial direction and the circumferential direction, while suppressing the number of components. Further, members having the same shape and configuration can be used for the first rotor portion 27 and the second rotor portion 28. Further, various connection methods can be selected for connection to the rotating member 100. As a result, a rotating electric machine having a high degree of freedom in structural design can be realized.

Figure 18:
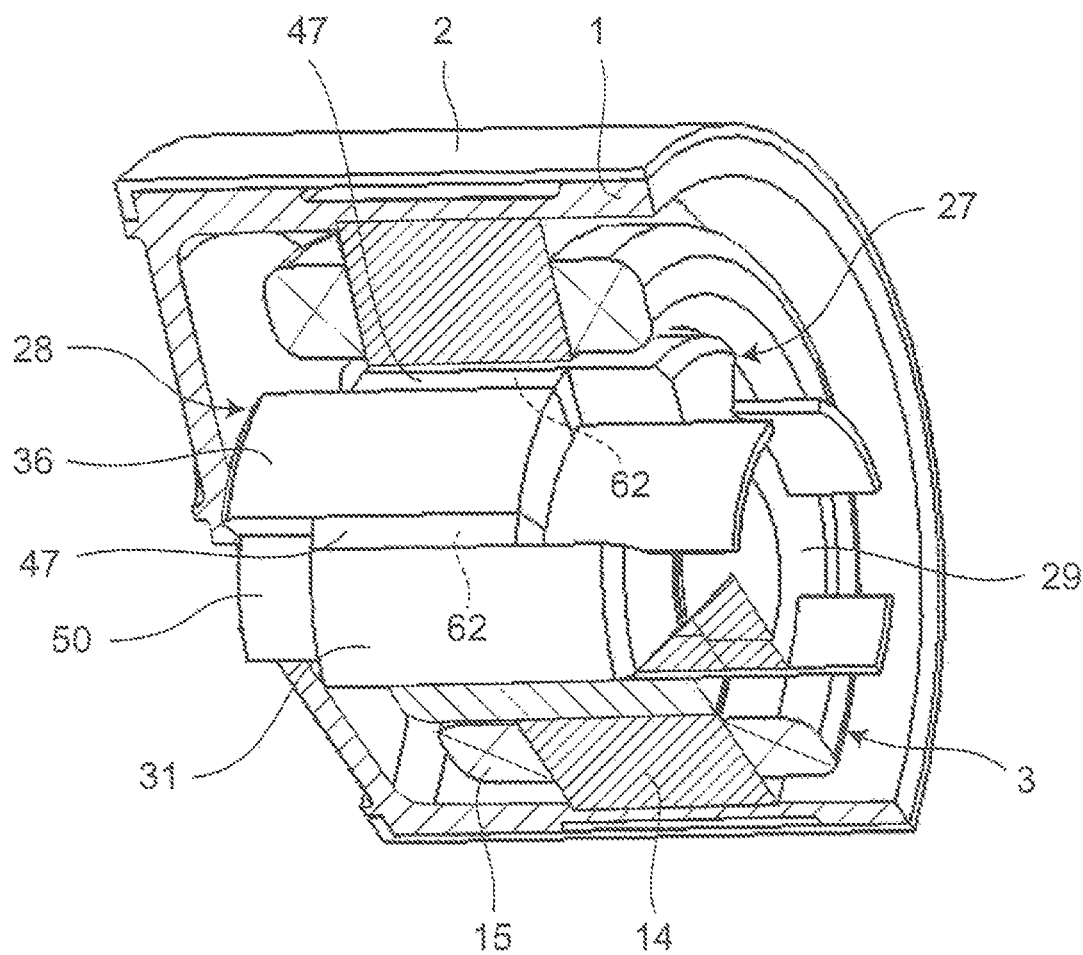
FIG. 18 is a partially cutaway perspective view of a rotating electric machine according to another embodiment.

As shown in FIG. 18, the rotating electric machine shown in FIGS. 12 to 15 may further include an auxiliary positioning member 47 disposed in the second gap 62. With such a configuration, circumferential positioning of the first rotor portion 27 and the second rotor portion 28 can be performed more reliably. Note that the auxiliary positioning member 47 may be made of a non-magnetic material or may be made of a permanent magnet.

Figure 19:
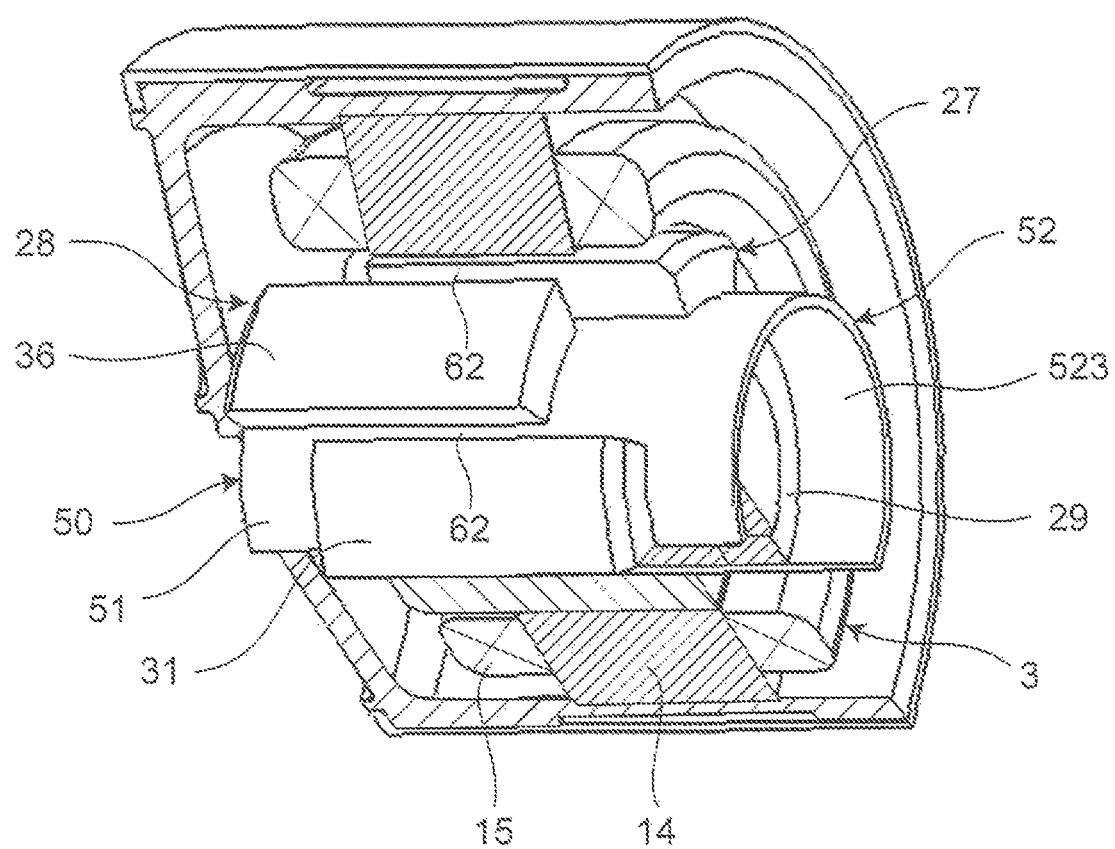
FIG. 19 is a partially cutaway perspective view of a rotating electric machine according to another embodiment.
Figure 20:
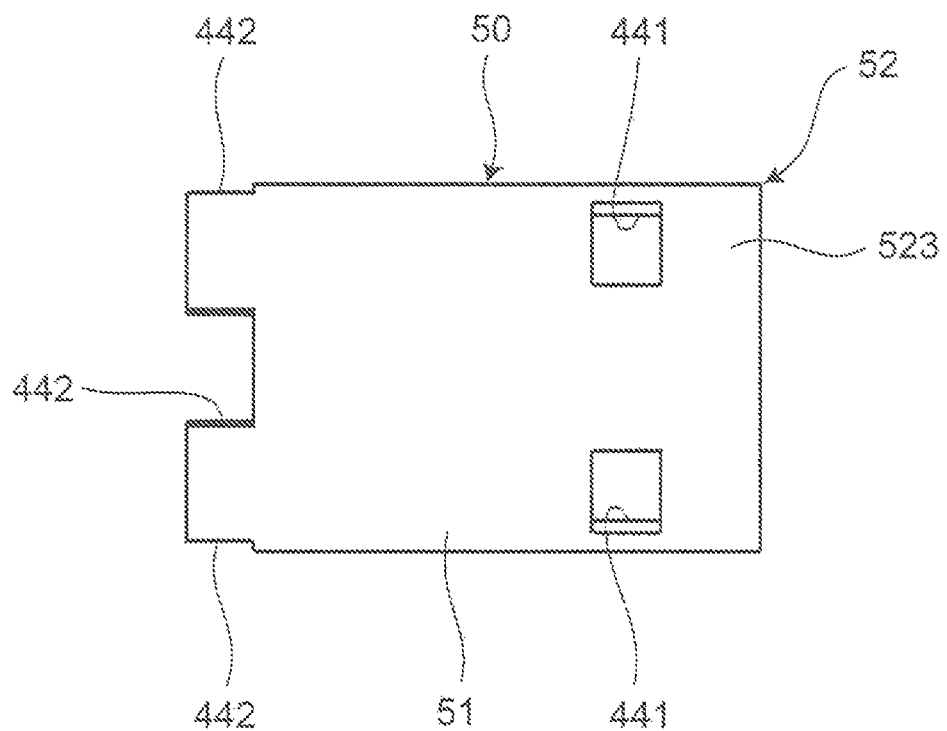
FIG. 20 is a side view of a positioning member according to another embodiment.

The connection shaft portion 52 is not limited to the case where it is formed of a plurality of plate members 521, but may be formed of one annular plate member 523 as shown in FIGS. 19 and 20.

Figure 21:
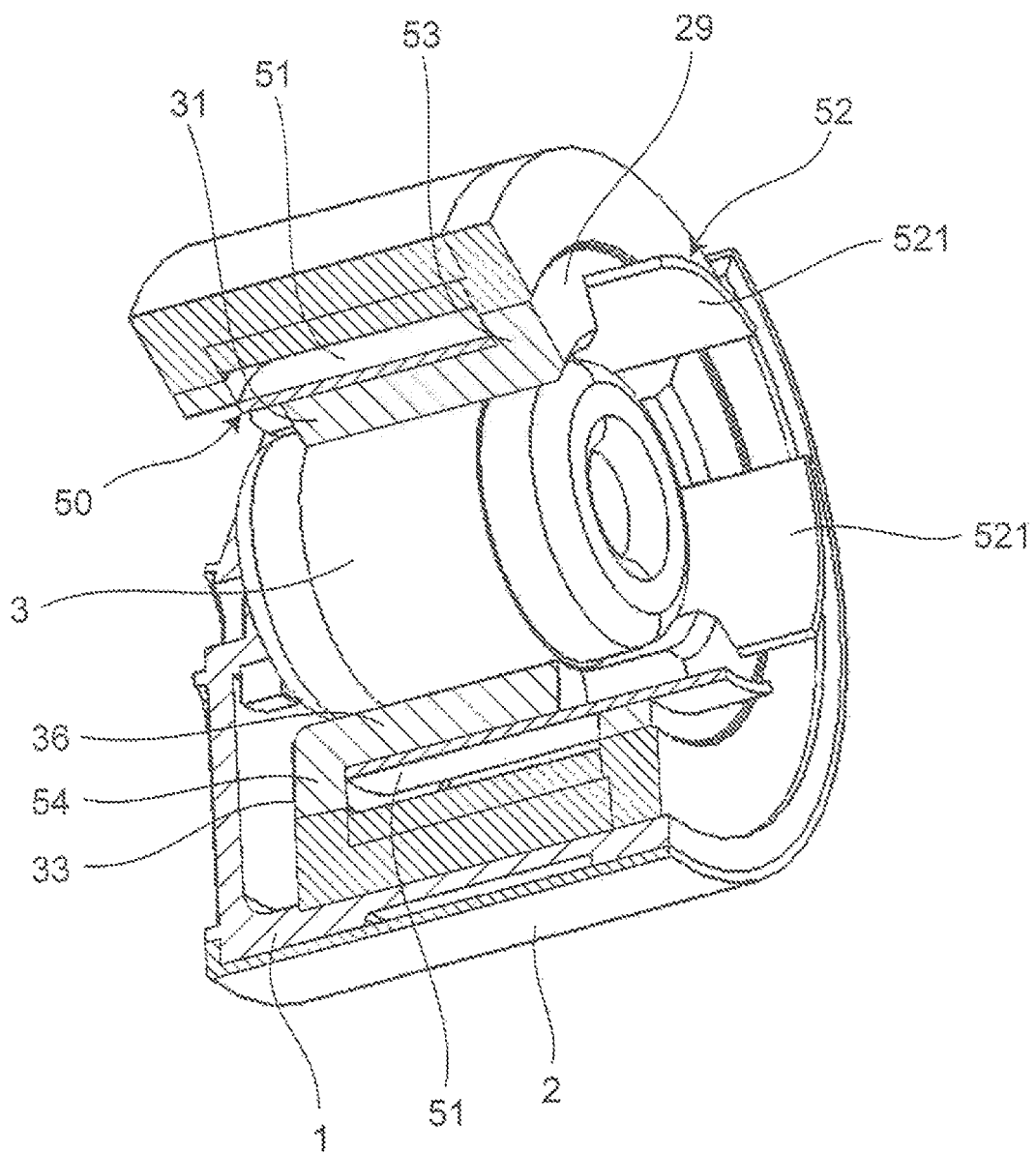
FIG. 21 is a partially cutaway perspective view of a rotating electric machine according to another embodiment.
Figure 22:
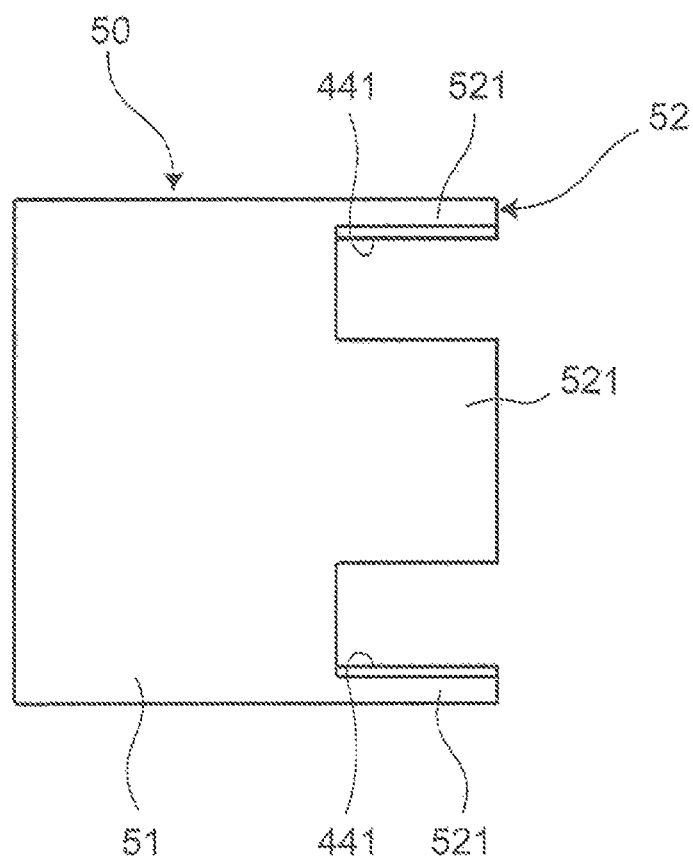
FIG. 22 is a side view of a positioning member according to another embodiment.
Figure 23:
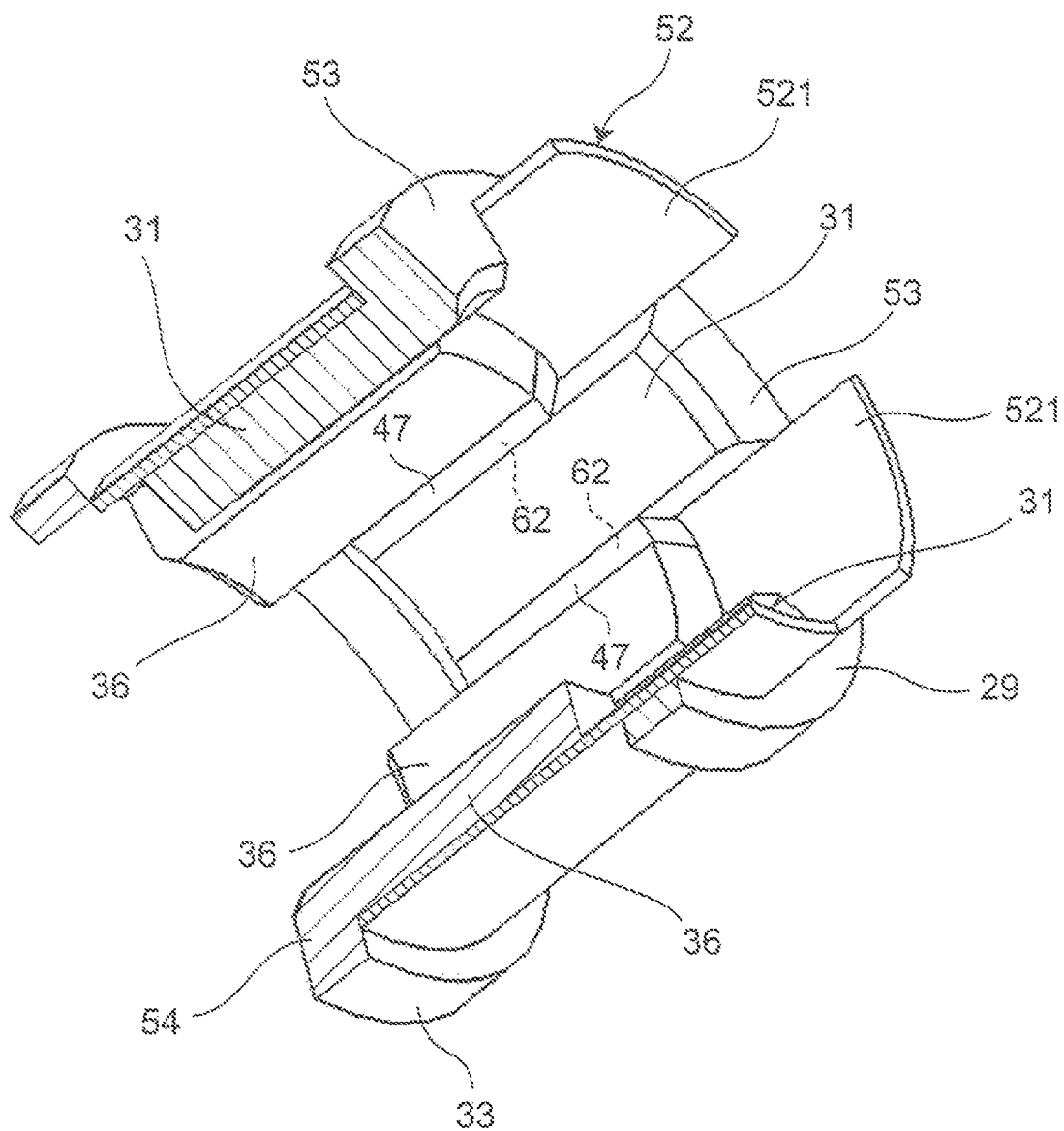
FIG. 23 is a partially cutaway perspective view of a rotor according to another embodiment.

As shown in FIGS. 21 to 23, the stator 3 can be disposed inside the rotor 5 in the radial direction. In this case, as shown in FIG. 23, the first rotor portion 27 has a first connecting portion 53 extending radially inward from the inner peripheral surface of the first annular portion 29, and the first extending portion 31 is disposed radially inside the positioning member 50. The second rotor portion 28 has a second connecting portion 54 extending radially outward from an inner peripheral surface of the second annular portion 33, and the second extending portion 36 is disposed radially inside the positioning member 50. In the second gap 62, the auxiliary positioning member 47 is disposed. With such a configuration, the field coil having a degree of freedom in shape is disposed on the outer periphery while increasing the rotational strength, so that the determined space of the outer shell can be effectively used. Note that, as shown in FIG. 22, in the rotating electric machine shown in FIGS. 21 to 23, for example, only the first groove portion 441 is formed in the positioning member 50, and the second groove portion 442 is not formed. That is, the second groove portion 442 can be omitted.

Figure 24:
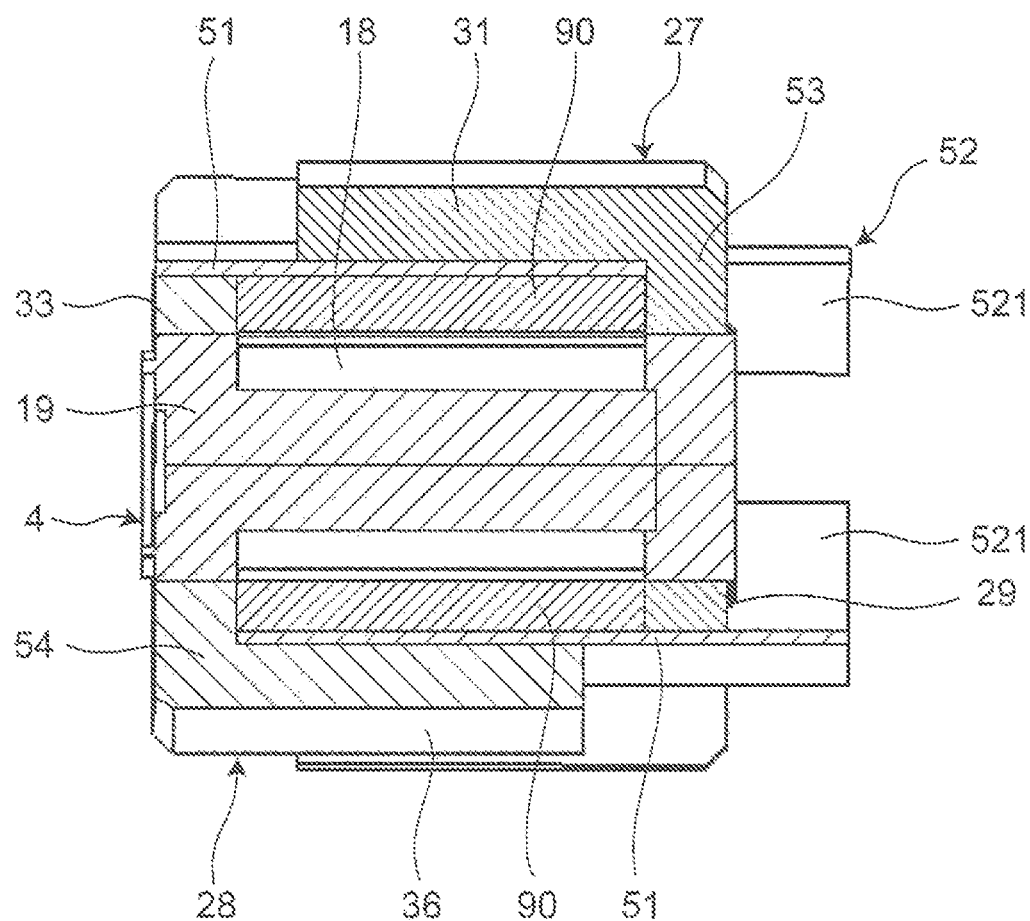
FIG. 24 is a partially cutaway side view of a rotor according to another embodiment.

As shown in FIG. 24, the rotating electric machine shown in FIGS. 12 to 15 can further include a permanent magnet 90 disposed between the iron core 4 and the rotor 5 in the radial direction.

Figure 25:
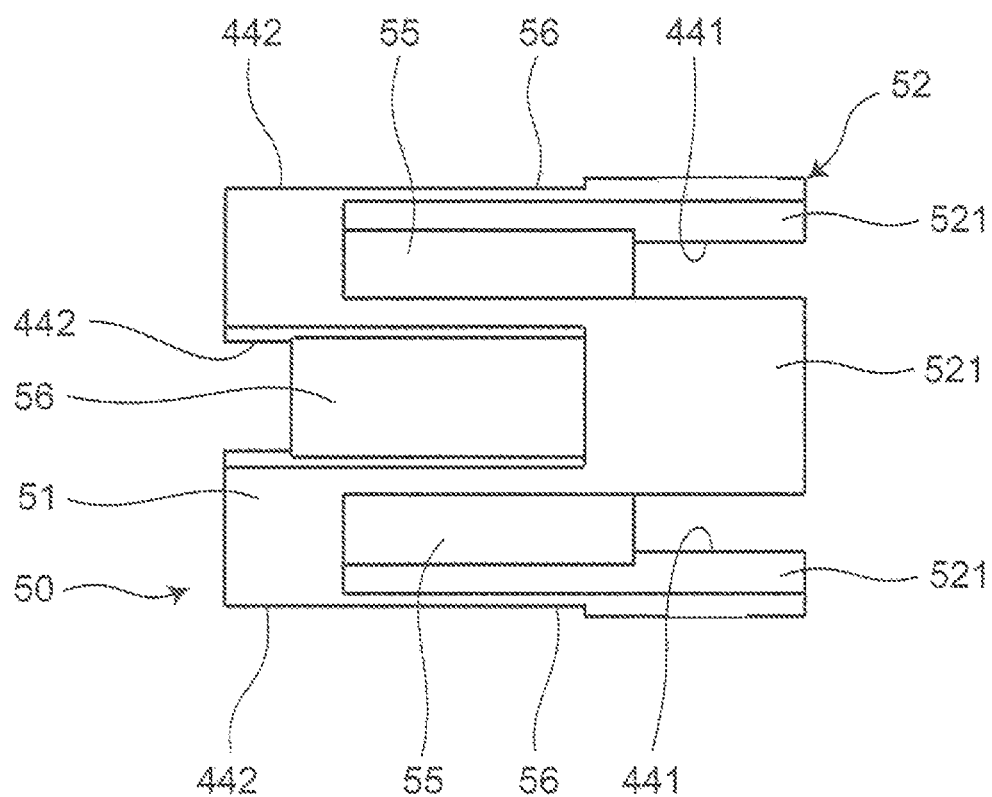
FIG. 25 is a side view of a positioning member according to another embodiment.

As shown in FIG. 25, accommodating recessed portions 55 and 56 capable of accommodating the first extending portion 31 or the second extending portion 36 may be further provided on the outer surface of the positioning member 50 of the rotating electric machine shown in FIGS. 12 to 15. The accommodating recessed portion 55 extends from the first groove portion 441 in a direction approaching the other end of the main body 51 (in other words, a direction approaching the second groove portion 442). Further, the accommodating recessed portion 56 extends from the second groove portion 442 in a direction approaching one end of the main body 51 (in other words, a direction approaching the first groove portion 441). With such a configuration, the first rotor portion 27 and the second rotor portion 28 can be positioned more reliably in the axial direction and the circumferential direction. Further, since the torque generated in the first extending portion 31 and the second extending portion 36 can be received by the entire side surfaces of the accommodating recessed portions 55 and 56, the torque strength of the rotor 5 can be increased. In addition, the recessed portions 55 and 56 may be provided in, for example, only one of the first groove portion 441 and the second groove portion 442.

The positioning member 50 is not limited to a substantially cylindrical shape, and may be, for example, a polygonal cylindrical shape.

In addition, by appropriately combining any of the above-described various embodiments or modifications, the effects of the respective embodiments or modifications can be achieved. In addition, a combination of the embodiments or a combination of the examples or a combination of the embodiment and the example is possible, and a combination of the features in the different embodiments or the examples is also possible.

The present invention is applicable to, for example, HEVs (hybrid electric vehicles), EVs (electric vehicles), and other devices that include an electric motor as a component.

REFERENCE SIGNS LIST

1: housing
2: jacket
3: stator
4: field coil iron core
5: rotor
6: housing body
6a: wall portion
8: stepped recessed portion
9: through hole
10: guide portion
11: rib
12: annular groove
13: cooling water passage
14: stator core
15: coil
16: field coil core body
17: field coil core flange portion
18: field coil
19: iron core portion
20: flange portion
21: positioning recessed portion
22: flow hole
23: annular convex portion
24: pipe (flow path)
25: annular passage (flow path)
26: bearing
27: first rotor portion
28: second rotor portion
29: first annular portion
30: cylindrical portion
31: first extending portion
32: first relief portion
33: second annular portion
34: pedestal portion
35: rotary shaft
36: second extending portion
37: second relief portion
38: positioning pin
39: cylindrical portion
40: recessed portion
41: first positioning member
42: second positioning member
43: reinforcing ring
44: groove portion
441: first groove portion
442: second groove portion
45: flow hole
46: groove
50: positioning member
51: main body
52: connection shaft portion
521: plate member
522: flange portion
523: annular plate member
53: first connecting portion
54: second connecting portion
55, 56: accommodating recessed portion
61: first gap
62: second gap
63: third gap
71: second protruding portion
72: second locking portion
73: first protruding portion
74: first locking portion
81: bedsill
82: shaft member
90: permanent magnet
100: rotating member

The invention claimed is:
1. A rotating electric machine comprising:
a non-rotating member;
a stator fixed to the non-rotating member;
a field coil fixed to the non-rotating member, disposed on an inner diameter side of the stator, and having an iron core and a winding wound around the iron core;
a rotor rotatably disposed between the stator and the field coil; and
a positioning member, wherein the rotor includes a first rotor portion and a second rotor portion respectively arranged along an extending direction of a rotary shaft of the rotor, the first rotor portion includes a first annular portion and a first extending portion as a single unitary member, the first annular portion extending in a circumferential direction with respect to the rotary shaft of the rotor, the first extending portion extending from the first annular portion in the extending direction, the second rotor portion includes a second annular portion and a second extending portion as a single unitary member, the second annular portion extending in the circumferential direction and disposed with a first gap with respect to the first extending portion in the extending direction, the second extending portion extending from the second annular portion in the extending direction, disposed with a second gap with respect to the first extending portion in the circumferential direction, and disposed with a third gap with respect to the first annular portion in the extending direction, and the positioning member is disposed in each of the first gap, the second gap, and the third gap to position each of the first rotor portion and the second rotor portion in the circumferential direction and the extending direction, the positioning member is made of a permanent magnet or a non-magnetic material, the positioning member includes a first positioning member made of a permanent magnet, and a second positioning member made of a non-magnetic material, the second positioning member is disposed in each of the first gap and the third gap, and the first positioning member is disposed in the second gap, the second positioning member disposed in the third gap occupies only a part of the third gap and extends between the first annular portion and the second extending portion in the extending direction, and the second positioning member disposed in the first gap occupies only a part of the first gap and extends between the first extending portion and the second annular portion in the extending direction.

* * * * *